US007895335B2

(12) United States Patent
Watson, Jr.

(10) Patent No.: US 7,895,335 B2
(45) Date of Patent: Feb. 22, 2011

(54) ENABLING COMMUNICATIONS OF ELECTRONIC DATA BETWEEN AN INFORMATION REQUESTOR AND A GEOGRAPHICALLY PROXIMATE SERVICE PROVIDER

(75) Inventor: Richard A. Watson, Jr., Austin, TX (US)

(73) Assignee: AOL Inc., Dulles, VA (US)

( * ) Notice: Subject to any disclaimer, the term of this patent is extended or adjusted under 35 U.S.C. 154(b) by 1581 days.

(21) Appl. No.: 09/893,693

(22) Filed: Jun. 29, 2001

(65) Prior Publication Data

US 2002/0026517 A1 Feb. 28, 2002

Related U.S. Application Data

(60) Provisional application No. 60/215,774, filed on Jun. 30, 2000.

(51) Int. Cl.
*G06F 15/16* (2006.01)
(52) U.S. Cl. .......................... 709/227; 709/228
(58) Field of Classification Search .............. 709/203, 709/227–228
See application file for complete search history.

(56) References Cited

U.S. PATENT DOCUMENTS

| 5,583,920 A | 12/1996 | Wheeler, Jr. |
| 5,608,786 A | 3/1997 | Gordon |
| 5,610,910 A | 3/1997 | Focsaneanu et al. |
| 5,721,906 A | 2/1998 | Siefert |
| 5,742,905 A | 4/1998 | Pepe et al. |
| 5,826,014 A * | 10/1998 | Coley et al. .................. 713/201 |
| 5,946,617 A * | 8/1999 | Portaro et al. ............ 455/422.1 |
| 5,991,791 A | 11/1999 | Siefert |
| 6,026,403 A | 2/2000 | Siefert |
| 6,049,533 A * | 4/2000 | Norman et al. ............. 370/328 |
| 6,094,437 A * | 7/2000 | Loehndorf et al. .......... 370/420 |
| 6,233,577 B1 | 5/2001 | Ramasubramani et al. |
| 6,256,675 B1 * | 7/2001 | Rabinovich .................. 709/241 |
| 6,578,066 B1 * | 6/2003 | Logan et al. ................. 718/105 |
| 6,658,000 B1 * | 12/2003 | Raciborski et al. .......... 370/386 |
| 6,785,554 B1 * | 8/2004 | Amerga ...................... 455/517 |
| 6,799,039 B2 * | 9/2004 | Wu et al. ..................... 455/436 |
| 6,904,026 B1 * | 6/2005 | Tarnanen et al. ............ 370/329 |
| 6,907,243 B1 * | 6/2005 | Patel .......................... 455/442 |

FOREIGN PATENT DOCUMENTS

WO  WO 97/14234  4/1997

OTHER PUBLICATIONS

"AOL technology: turning complicated things into engaging services", 1996 Annual Report, 22 pages.

* cited by examiner

*Primary Examiner*—Hussein A Elchanti
(74) *Attorney, Agent, or Firm*—Finnegan, Henderson, Farabow, Garrett & Dunner, LLP

(57) ABSTRACT

Systems and methods for transferring electronic data comprising receiving a request to access a communications system at a first geographic location from a client located at a second geographic location remote from the first geographic location; identifying a proxy local to the client in the second geographic location; and receiving subsequent data requests from the client at the proxy.

30 Claims, 8 Drawing Sheets

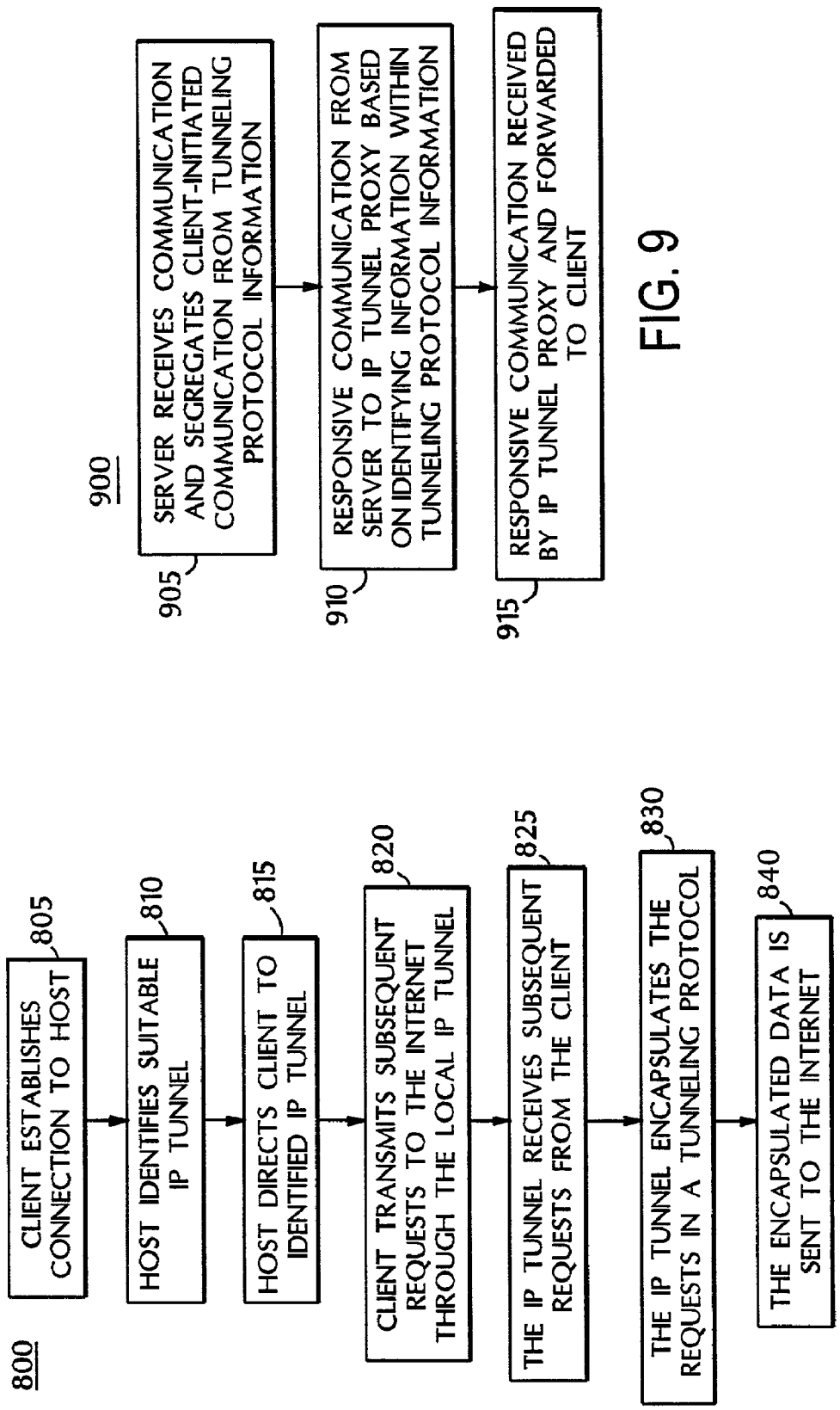

ENABLING COMMUNICATIONS OF ELECTRONIC DATA BETWEEN AN INFORMATION REQUESTOR AND A GEOGRAPHICALLY PROXIMATE SERVICE PROVIDER

This application claims the benefit of U.S. Provisional Application No. 60/215,774 filed Jun. 30, 2000, which is incorporated by reference.

TECHNICAL FIELD

The present invention relates generally to a system and method for transferring electronic data in a communications system.

BACKGROUND

Online service providers are constantly offering new services and upgrading existing services to enhance the online experience of their subscriber. Subscribers have on-demand access to news, weather, financial, sports, and entertainment services as well as the ability to transmit electronic messages and to participate in online discussion groups. For example, subscribers of online service providers (OSPs), such as America Online or CompuServe, may access servers located throughout the world and retrieve information concerning a wide variety of topics from those servers. A server may be maintained by the service provider or by a third party provider who makes information and services available to the service provider through a worldwide network of computers.

SUMMARY

In one general aspect, electronic data are transferred by receiving subsequent requests from the client to access a communications system at a first geographic location from a client located at a second geographic location remote from the first geographic location; identifying a proxy local to the client in the second geographic location; and receiving subsequent data requests from the client at the proxy.

Implementations may include one or more of the following features. For example, the data requests may be encapsulated in a tunneling protocol at a proxy. The tunneling proxy may include a user datagram protocol. Implementations also may include determining whether the data requests can be satisfied by electronic data stored in a cache at the second geographic location; sending the data requests to the Internet; retrieving electronic data responsive to the data requests at the proxy; storing electronic data responsive to the data requests in a cache at the second geographic location; performing filtering of electronic data at the proxy according to user-defined preferences; and transferring electronic data responsive to the data requests to the client from the proxy.

The first geographic location may be in a first country and the second geographic location may be in a second country different than the first country. The communications system may be an online service provider, and the proxy may be an IP tunnel, such as a Layer Two Tunneling Protocol tunnel.

The described techniques reduce the time required for an OSP to fulfill data requests from subscribers and enable the OSP to maintain a certain level of control over the content delivered to its subscribers. Because unfettered access to the public Internet may compromise its proprietary nature, an OSP may prevent Internet servers from directly fulfilling requests from its subscribers. A subscriber thus may be required to communicate with a remote OSP even when the request could be satisfied by data stored on an Internet server local to the subscriber.

By using a proxy local to the subscriber, for example, an OSP that must communicate with a significant number of geographically dispersed subscribers from a centralized location can avoid the significant delays resulting from long distance communication and still buffer its subscriber from the public Internet. Through the proxy, the OSP may act transparently to the subscriber and perform functions such as protocol conversion and/or encapsulation of requests from subscribers and data received from Internet servers.

Other features and advantages will be apparent from the following description, including the drawings, and from the claims.

DESCRIPTION OF THE DRAWINGS

FIGS. 8 and 9 are flowcharts of a communications method that may be implemented by the system of FIG. 1.

DETAILED DESCRIPTION

For illustrative purposes, FIGS. 1-5 describe a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
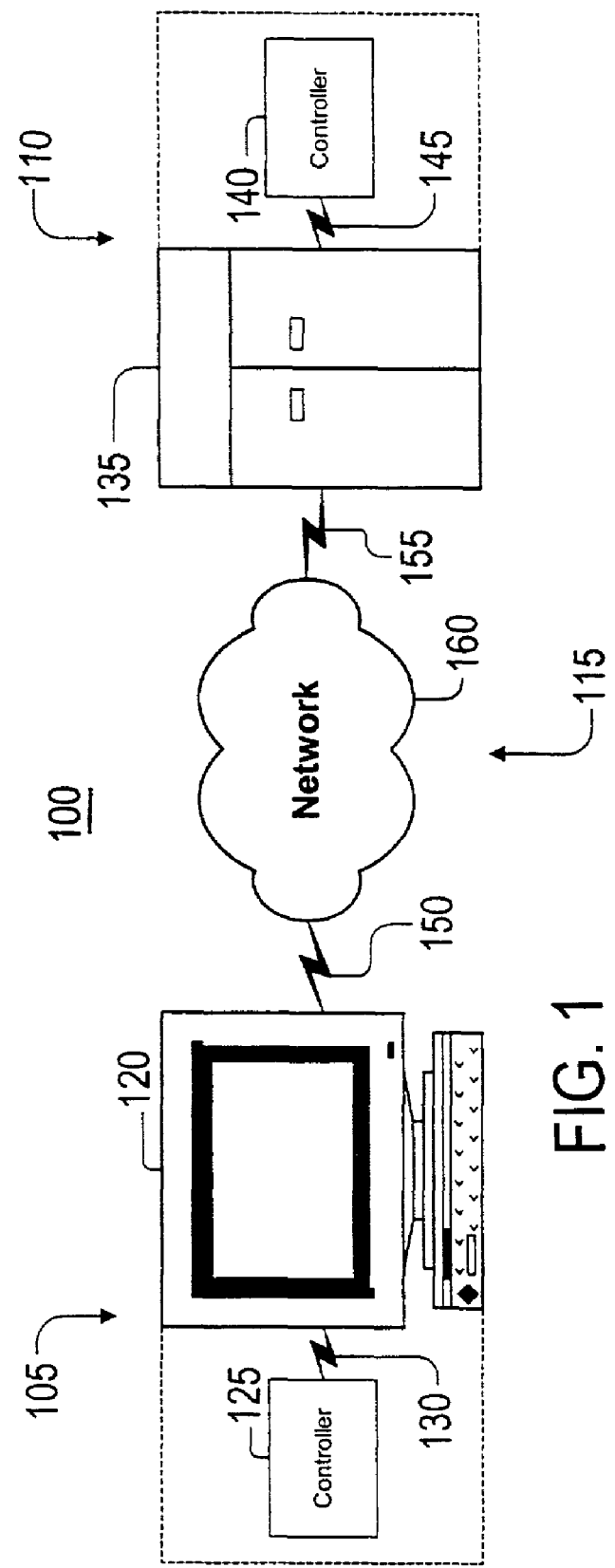
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125. For example, the client system 105 may include one or more general-purpose computers (e.g., personal computers), one or more special-purpose computers (e.g., devices specifically programmed to communicate with each other and/or the host system 110), or a combination of one or more general-purpose computers and one or more special-purpose computers. The client system 105 may be arranged to operate within or in concert with one or more other systems, such as for example, one or more LANs ("Local Area Networks") and/or one or more WANs ("Wide Area Networks").

The client device 120 is generally capable of executing instructions under the command of a client controller 125. The client device 120 is connected to the client controller 125 by a wired or wireless data pathway 130 capable of delivering data.

The client device 120 and client controller 125 each typically includes one or more hardware components and/or software components. An example of a client device 120 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of client controller 125 is a software application loaded on the client device 120 for commanding and directing communications enabled by the client device 120. Other examples include a program, a piece of code, an instruction, a device, a computer, a computer system, or a combination thereof, for independently or collectively instructing the client device 120 to interact and operate as described herein. The client controller 125 may be embodied permanently or temporarily in any type of machine, component, equipment, storage medium, or propagated signal capable of providing instructions to the client device 120.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, or xDSL), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

The host system 110 includes a host device 135 capable of executing instructions under the command and direction of a host controller 140. The host device 135 is connected to the host controller 140 by a wired or wireless data pathway 145 capable of carrying and delivering data.

The host system 110 typically includes one or more host devices 135 and/or host controllers 140. For example, the host system 110 may include one or more general-purpose computers (e.g., personal computers), one or more special-purpose computers (e.g., devices specifically programmed to communicate with each other and/or the client system 105), or a combination of one or more general-purpose computers and one or more special-purpose computers. The host system 110 may be arranged to operate within or in concert with one or more other systems, such as, for example, one or more LANs ("Local Area Networks") and/or one or more WANs ("Wide Area Networks").

The host device 135 and host controller 140 each typically includes one or more hardware components and/or software components. An example of a host device 135 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of host controller 140 is a software application loaded on the host device 135 for commanding and directing communications enabled by the host device 135. Other examples include a program, a piece of code, an instruction, a device, a computer, a computer system, or a combination thereof, for independently or collectively instructing the host device 135 to interact and operate as described herein. The host controller 140 may be embodied permanently or temporarily in any type of machine, component, equipment, storage medium, or propagated signal capable of providing instructions to the host device 135.

Figure 2:
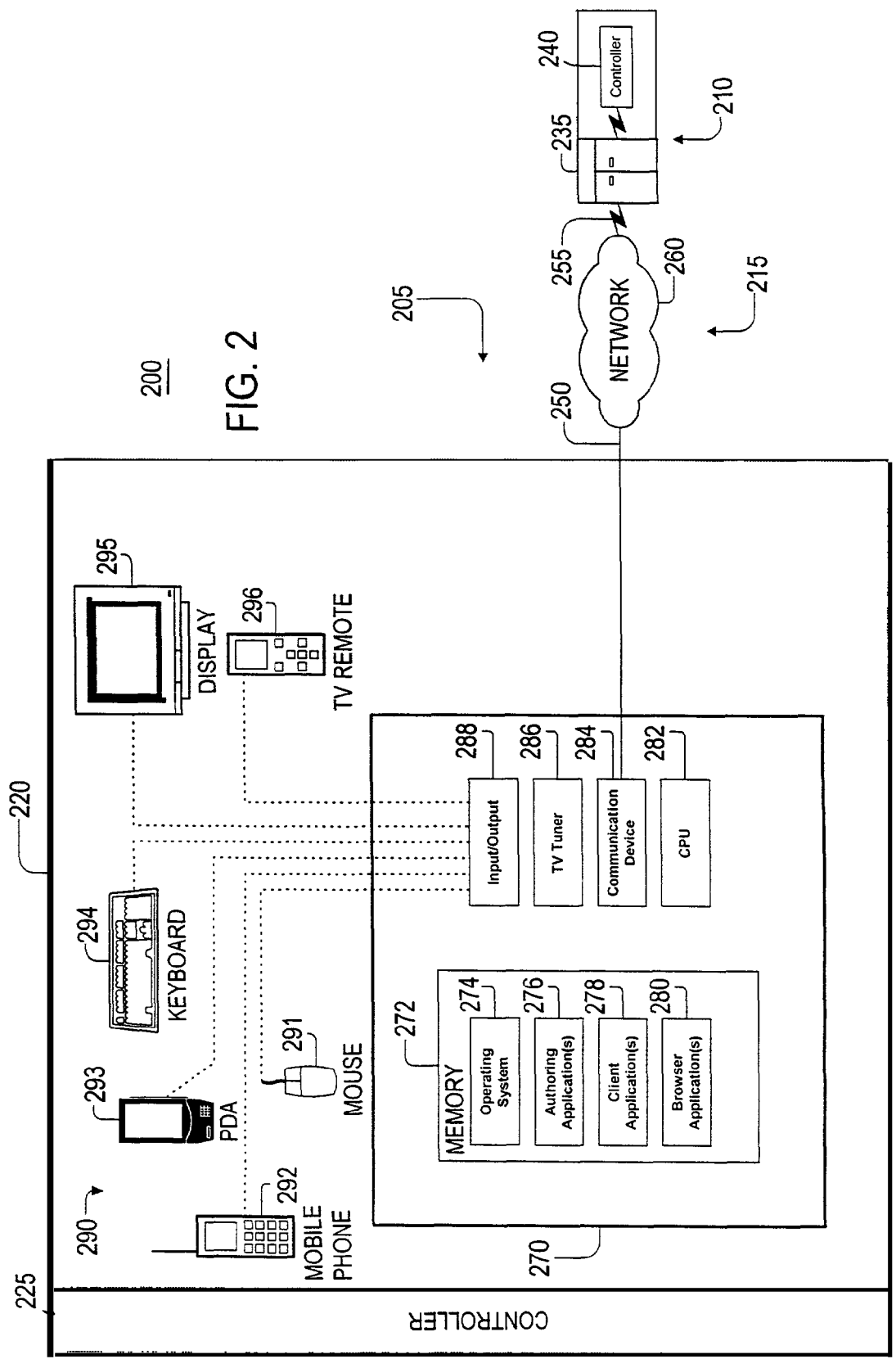
FIGS. 2-7 are block diagrams of expansions of aspects of the system of FIG. 1.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communication system of FIG. 2 are broadly described above with respect to FIG. 1. In particular, the host system 210 and communications link 215 typically have attributes comparable to those described with respect to host system 110 and communications link 115 of FIG. 1. Likewise, the client system 205 of FIG. 2 typically has attributes comparable to and illustrates one possible embodiment of the client system 105 of FIG. 1.

The client device 220 typically includes a general purpose computer 270 having an internal or external storage 272 for storing data and programs such as an operating system 274 (e.g., DOS, Windows™, Windows 95™, Windows 98™, Windows 2000™, Windows NT™, OS/2, or Linux) and one or more application programs. Examples of application programs include authoring applications 276 (e.g., word processing, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and performed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 for wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, a TV remote control 296 for receiving information from and rendering information to subscribers, and an audiovisual input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
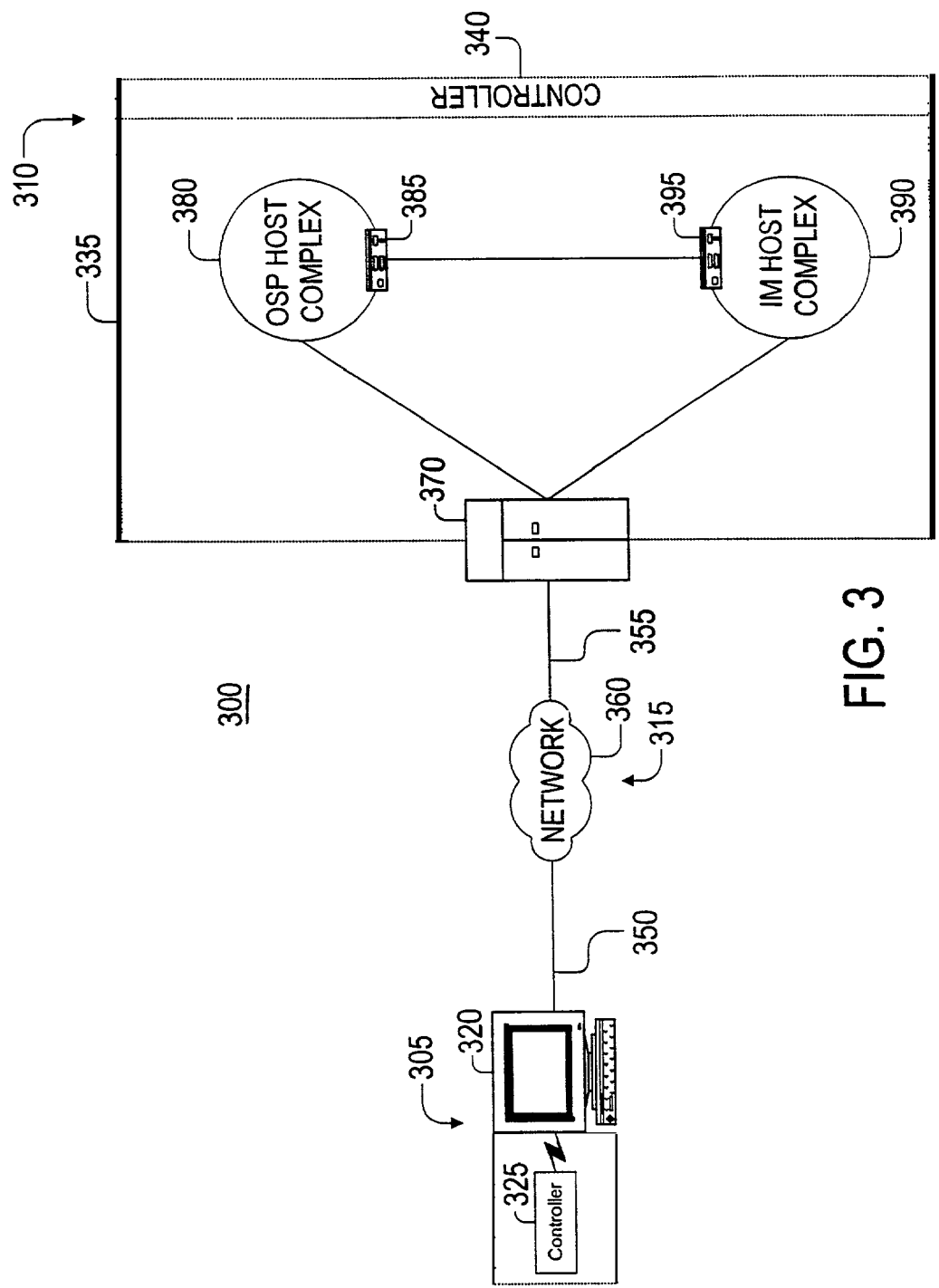

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communication system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and illustrates one possible embodiment of the host systems 110 and 210 shown in FIGS. 1 and 2, respectively.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. However, in other implementations, as described above, the host controller 340 may include any of several other programs, machines, and devices operating independently or collectively to control the host device 335.

The host device 335 includes a login server 370 for enabling access by subscribers and routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 includes communication software, for example, an OSP client application and an IM client application. The OSP and IM communication software applications are designed to facilitate the subscriber's interactions with the respective services and, in particular, may provide access to all the services available within the respective host complexes.

Typically, the OSP host complex 380 supports different services, such as email, discussion groups, chat, news services, and Internet access. The OSP host complex 380 is generally designed with an architecture that enables the machines within the OSP host complex 380 to communicate with each other and employs certain protocols (i.e., standards, formats, conventions, rules, and structures) to transfer data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the MI host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex 395 gateway may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding the protocol type anticipated by a destination complex, which enables any necessary protocol conversion to be performed incident to the transfer of data from one complex to another. For instance, the OSP host complex 380 and IM host complex 390 generally use different protocols such that transferring data between the complexes requires protocol conversion by or at the request of the OSP host complex gateway 385 and/or the IM host complex gateway 395.

Figure 4:
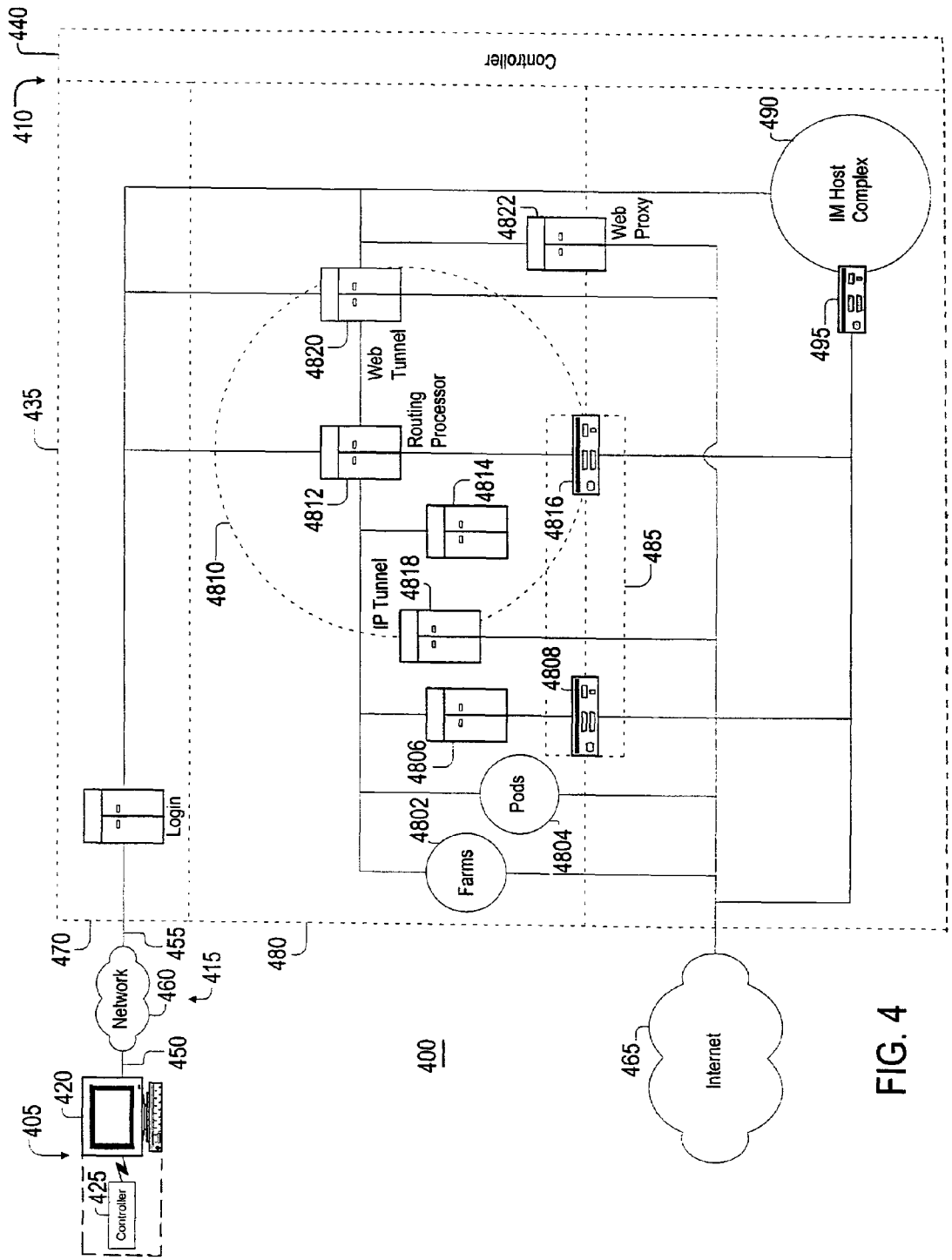

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460. As shown, the client system 405 may access the Internet 465 through the host system 410.

Examples of each element within the communication system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3. Likewise, the host system 410 of FIG. 4 may have attributes comparable to and illustrates one possible embodiment of the host systems 110, 210, and 310 shown in FIGS. 1-3, respectively. However, FIG. 4 describes an aspect of the host system 410, focusing primarily on one particular implementation of OSP host complex 480. For purposes of communicating with an OSP host complex 480, the delivery network 460 is generally a telephone network.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using exclusive OSP protocols. The client controller 425 also may include applications, such as an IM client application, and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. However, in other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login server 470 may implement one or more authorization procedures to enable simultaneous access to the OSP host complex 480 and the IM host complex 490. The OSP host complex 480 and the IM host complex 490 are connected through one or more OSP host complex gateways 485 and one or more IM host complex gateways 495. Each OSP host complex gateway 485 and IM host complex gateway 495 may perform any protocol conversions necessary to enable communication between the OSP host complex 480, the IM host complex 490, and the Internet 465.

The OSP host complex 480 supports a set of services from one or more servers located internal to and external from the OSP host complex 480. Servers external to the OSP host complex 480 generally may be viewed as existing on the Internet 465. Servers internal to the OSP complex 480 may be arranged in one or more configurations. For example, servers may be arranged in centralized or localized clusters in order to distribute servers and subscribers within the OSP host complex 480.

In the implementation of FIG. 4, the OSP host complex 480 includes a routing processor 4802. In general, the routing processor 4802 will examine an address field of a data request, use a mapping table to determine the appropriate destination for the data request, and direct the data request to the appropriate destination. In a packet-based implementation, the client system 405 may generate information requests, convert the requests into data packets, sequence the data packets, perform error checking and other packet-switching techniques, and transmit the data packets to the routing processor 4802. Upon receiving data packets from the client system 405, the routing processor 4802 may directly or indirectly route the data packets to a specified destination within or outside of the OSP host complex 480. For example, in the event that a data request from the client system 405 can be satisfied locally, the routing processor 4802 may direct the data request to a local server 4804. In the event that the data request cannot be satisfied locally, the routing processor 4802 may direct the data request externally to the Internet 465 or the IM host complex 490 through the gateway 485.

The OSP host complex 480 also includes a proxy server 4806 for directing data requests and/or otherwise facilitating communication between the client system 405 and the Internet 465 through. The proxy server 4802 may include an IP ("Internet Protocol") tunnel for converting data from OSP protocol into standard Internet protocol and transmitting the data to the Internet 465. The IP tunnel also converts data received from the Internet in the standard Internet protocol back into the OSP protocol and sends the converted data to the routing processor 4802 for delivery back to the client system 405.

The proxy server 4806 also may allow the client system 405 to use standard Internet protocols and formatting to access the OSP host complex 480 and the Internet 465. For example, the subscriber can use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol") and routed to the proxy server 4806. The proxy server 4806 may include a L2TP ("Layer Two Tunneling Protocol") tunnel capable of establishing a point-to-point protocol (PPP) session with the client system 405.

The proxy server 4806 also may act as a buffer between the client system 405 and the Internet 465, and may implement content filtering and time saving techniques. For example, the proxy server 4806 can check parental controls settings of the client system 405 and request and transmit content from the Internet 465 according to the parental control settings. In addition, the proxy server 4806 may include one or more caches for storing frequently accessed information. If requested data is determined to be stored in the caches, the proxy server 4806 may send the information to the client system 405 from the caches and avoid the need to access the Internet 465.

Figure 5:
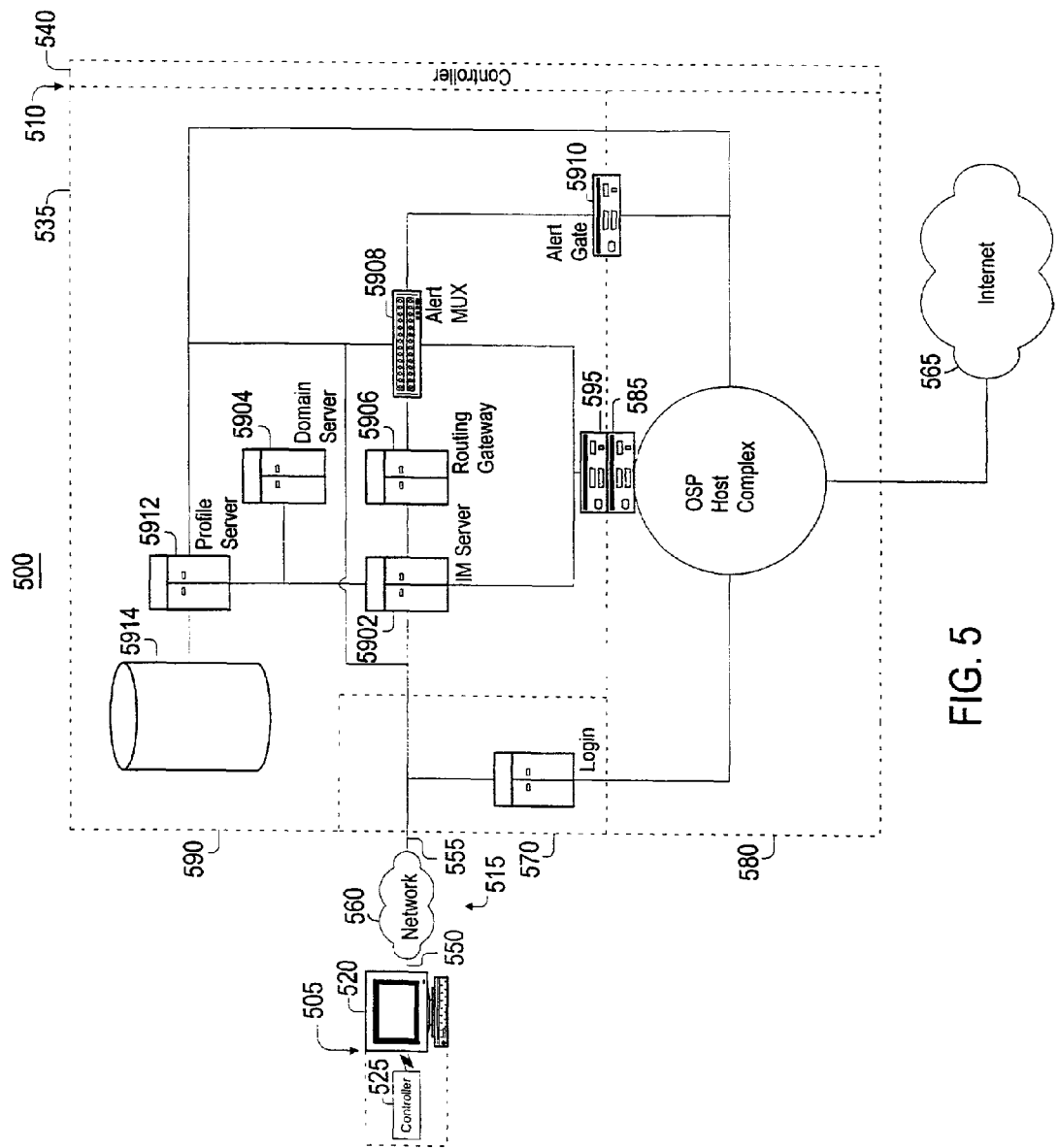

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communication system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4. Likewise, the host system 510 of FIG. 5 may have attributes comparable to and illustrates one possible embodiment of the host systems 110, 210, 310, and 410 shown in FIGS. 1-4, respectively. However, FIG. 5 describes an aspect of the host system 510, focusing primarily on one particular implementation of IM host complex 590. For purposes of communicating with the IM host complex 590, the delivery network 560 is generally a telephone network.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive IM protocols. The client controller 525 also may include applications, such as an OSP client application, and/or an Internet browser application for communicating with the OSP host complex 580 and the Internet 565, respectively.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host system 510 includes a login server 570 capable of enabling communications with and authorizing access by client systems 505 to various elements of the host system 510, including an OSP host complex 580 and an IM host complex 590. The login server 570 may implement one or more authorization procedures to enable simultaneous access to the OSP host complex 580 and the IM host complex 590. The OSP host complex 580 and the IM host complex 590 are connected through one or more OSP host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a Winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. In general, the purpose of the domain servers 5904 is to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

In the implementation of FIG. 5, the IM server 5902 is directly or indirectly connected to a routing gateway 5906. The routing gateway 5906 facilitates the connection between the IM server 5902 and one or more alert multiplexors 5908, for example, by serving as a link minimization tool or hub to connect several IM servers to several alert multiplexors. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing another hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie). The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to form a bridge to the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. However, the alert multiplexor 5908 also may communicate with the OSP host complex 580 through the IM gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Upon detecting an alert feed, the alert gate 5910 contacts the alert multiplexor 5908, which in turn, informs the client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, and geographic location. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using new or a different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 590 to share subscriber profile data with other services. Alternatively, user profile data may be saved locally on the client device 505.

Figure 6:
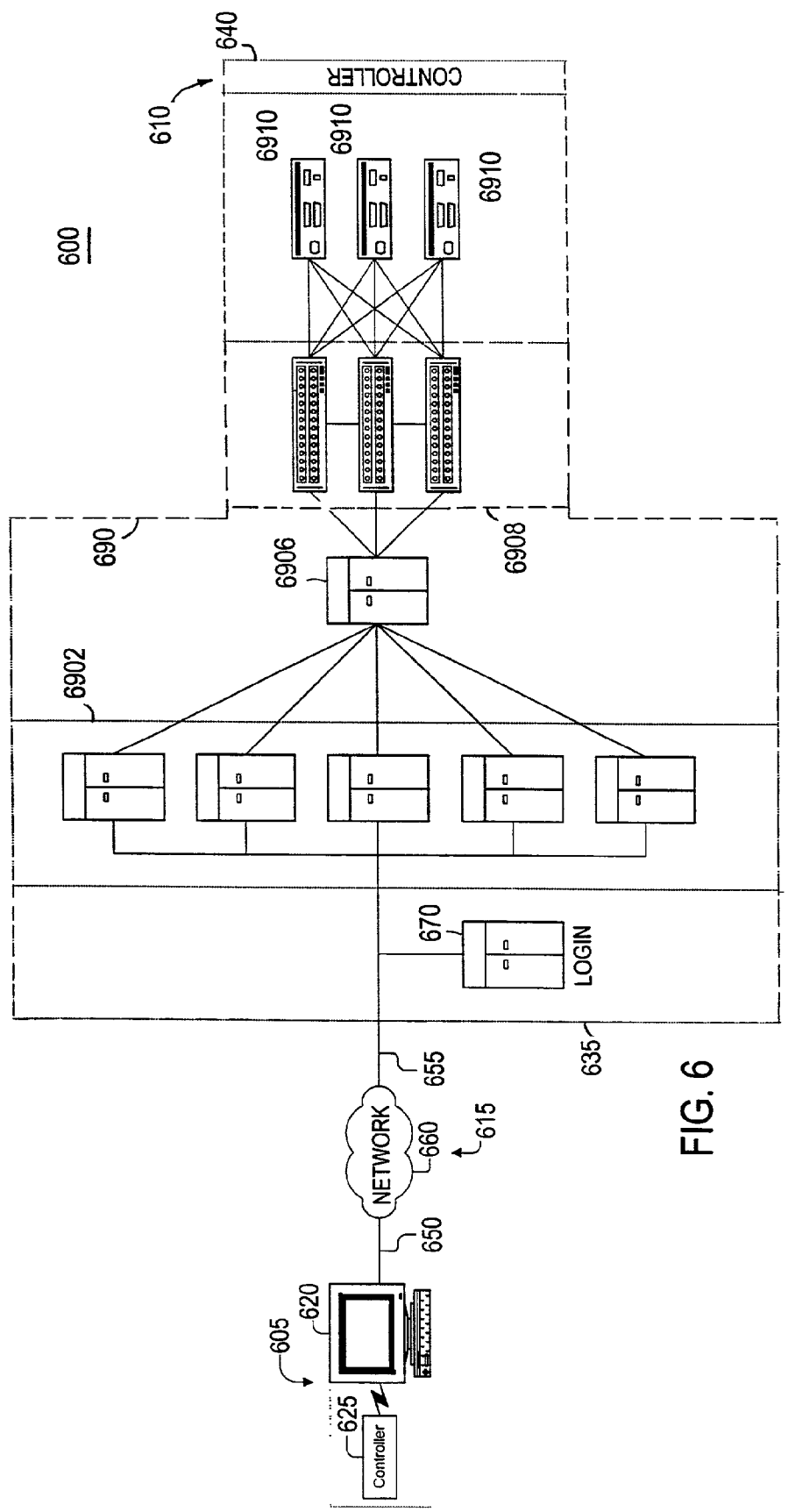

Referring to FIG. 6, a communications system 600 is capable of delivering and exchanging information between a client system 605 and a host system 610 through a communication link 615. Client system 605 typically includes one or more client devices 620 and one or more client controllers 625 for controlling the client devices 620. Host system 610 typically includes one or more host devices 635 and one or more host controllers 640 for controlling the host devices 635. The communication link may include communication pathways 650, 655 enabling communications through the one or more delivery networks 660. The network 660 may be any known or described delivery network including, but not limited to, a telephone network and/or the Internet. As shown, the client system 605 may access the Internet 665 through the host system 610.

Examples of each element within the communication system of FIG. 6 are broadly described above with respect to FIGS. 1-5. In particular, the client system 605 and the communications link 615 typically have attributes comparable to those described with respect to client systems 105, 205, 305, 405, and 505 and communications links 115, 215, 315, 415, and 515 of FIGS. 1-5, respectively. Likewise, the host system 610 of FIG. 6 may have attributes comparable to and may illustrate one possible implementation of the host systems 110, 210, 310, 410, and 510 shown in FIGS. 1-5.

Within the client system 605, the client controller 625 is generally capable of establishing a connection between the client system 605 and the host system 610 through the delivery network 615. In one implementation, the client controller 625 includes one or more applications, such as an IM application, an OSP application, and/or an Internet browser application.

Within the host system 610, the host controller 640 is generally capable of transmitting instructions to any or all of the elements of the host device 635. For example, in one implementation, the host controller 640 includes one or more software applications loaded on one or more elements of the host device 635. In other implementations, at the host controller 640 may include any of several other programs, machines, and devices operating independently or collectively to control the host device 635.

The host system 610 includes a login server 670 capable of enabling communications with and authorizing access by client systems 605 to various elements of the host system 610.

The host system 610 may have elements that are located in geographically remote locations, such as, for example, in more than one country. In one implementation, the host system 610 includes an OSP host complex 680 that includes hardware dispersed throughout multiple geographically remote locations, e.g., different countries. The OSP host complex 680 supports services including, but not limited to, e-mail, discussion groups, chat, news services, and Internet access. The OSP host complex 680 is designed with an architecture that enables the machines within the OSP host complex 680 to communicate with each other, and typically employs one or more OSP protocols and custom dialing engines to enable access only by subscribers. Some of the OSP protocols may be proprietary.

The OSP host complex 680 may include redundant OSP server banks 6810, 6815, each of which being capable of supporting the services offered by the OSP host complex 680. The OSP server banks 6810, 6815 are located in a main (i.e., central) location. They may be configured redundantly such that they are capable of performing identical functions and storing the same information. For instance, the OSP server banks 6810, 6815 may store the same subscriber information to provide backup functionality in case one of the OSP server banks 6810, 6815 fails. The login server 670 also is located proximate to OSP server banks 6810, 6815 at the main location, authorizing subscribers to enter the OSP host complex 680 irrespective of the location of the client system 605 used by the subscriber.

The OSP host complex 680 includes a remote Internet protocol ("IP") tunnel or web tunnel 6820 located in a geographically remote location, e.g., a different country, relative to the OSP server banks 6810, 6815 and the login server 670. The IP tunnel 6820 may include one or more interrelated servers capable of operating together to provide one or more services offered by the OSP host complex 680. The IP tunnel 6820 also may cache content received from sources within the OSP host complex 680 or the Internet 665, making frequently requested information readily available to local subscribers served by the IP tunnel 6820. The IP tunnel may be a Layer Two Tunneling Protocol ("L2TP") tunnel capable of establishing a point-to-point protocol ("PPP") session with the client system 605.

The IP tunnel 6820 is located local to the client system 605 relative to the central location of the OSP host complex 680. In one implementation, the IP tunnel 6820 is located in the same geographical region (e.g., same country) as the client system 605. A subscriber located in a country different from the central location of the OSP host complex 680, therefore, can use the geographically local IP tunnel 6820 to retrieve information from a geographically local server 6650 on the Internet 665. The IM tunnel 6820 effectively acts as a proxy for the centralized web and IP tunnels, eliminating the need for communications from the client system 605 and the geographically remote elements within the OSP host complex 680.

Due to the proprietary nature of the OSP host complex 680, requests from the client system 605 to the Internet 665 generally pass through the OSP host complex 680. For example, even where the destination server 6650 is geographical local to the client system 605, the destination server 6650 does not fulfill a request from the client system 605 directly. Rather, the OSP host complex 680 performs protocol conversion and/or encapsulation of requests from subscribers and received data. Accordingly, the OSP host complex 680 acts as a buffer between its subscribers and the public Internet 665. In this way, the OSP host complex 680 can enforce a subscriber's parent controls and ensure appropriate safeguards.

However, by using IP tunnel 6820 to route communications between client system 605 and a geographically local server 6650, communications between those components can be made quicker and with less Internet traffic. It is noteworthy that communications handled by IP tunnel 6820 may be directed from the client system 605 or the local server 6650.

Figure 7:
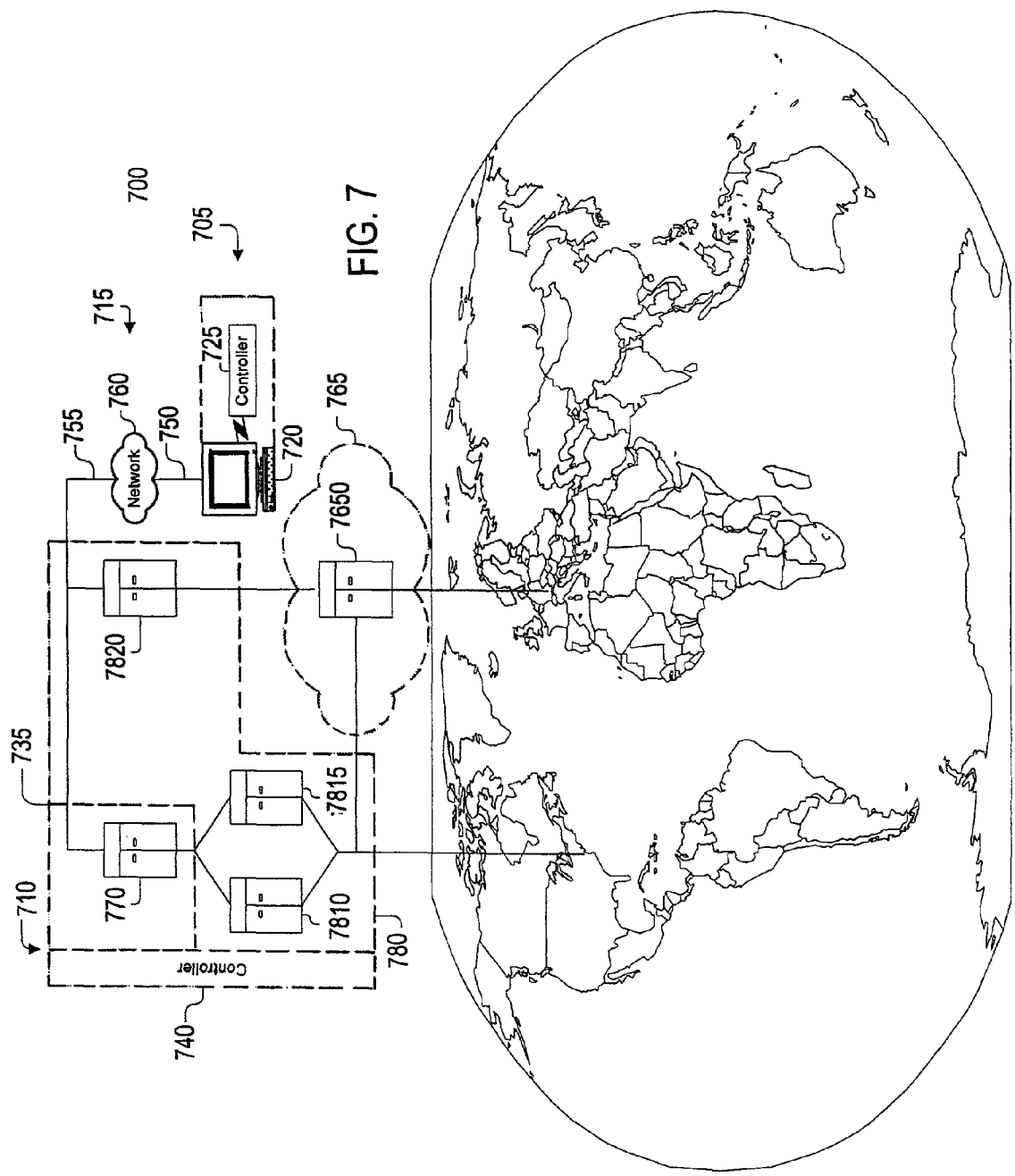

Referring to FIGS. 7 and 8, a client and a host interact according to procedures 700 and 800 to transfer electronic data between a client 702 and a host 704. In one implementation, delays inherent in the transmission of the electronic data to a remotely located OSP device are at least partially avoided through the use of a proxy. The procedures 700 and 800 may be implemented by any type of hardware, software, device, computer, computer system, equipment, component, program, application, code, storage medium, or propagated signal.

Examples of each element of FIG. 7 are broadly described above with respect to FIGS. 1-6. In particular, client 702 typically has attributes comparable to those described with respect to client devices 120, 220, 320, 420, 520, and 620 and/or client controllers 125, 225, 325, 425, 525, and 625. The host 704 typically has attributes comparable to those described above with respect to host devices 135, 235, 335, 435, 535, and 635 and/or host controllers 140, 240, 340, 440, 540, and 640. The client 702 and the host 704 may be directly or indirectly interconnected through a known or described delivery network.

The procedure 700 of FIG. 7 generally pertains to communications between a client 702 through a proxy that is identified by the host 704, and other communications initiated by or directed from the client 702. Initially, the client 702 establishes a connection to the host 704 (step 705). In one implementation, the client 702 requests access from a login server.

An access request from the client 702 may take many forms. For instance, an access request may be the initial communication from the client 702 to the host 704 or may be included in a subsequent communication between the client 702 and the host 704. An access request also may be a request for access to an OSP host complex, a request for information, or any other communication with the host 704 after access is gained.

Upon receiving an access request, the login server uses the IP address of the client 702 to look up relevant information (e.g., parental control settings, user preferences, demographic information) associated with the subscriber. Such relevant information may have been entered previously by the subscriber or determined on the fly by the host 704. The demographic information may include, but is not limited to, information about the geographic location (e.g., the country) where the subscriber access request originated, the current client software version, and the type of access device being used. Using the relevant information, the host 704 identifies a suitable IP tunnel (step 710). Identification of a suitable IM tunnel may be based, for example, on whether the IP tunnel exists in the same geographic region as the client 702 and whether the client 702 is able to use the IP tunnel. Other information that may be used to identify an appropriate IP tunnel may include demographic information about user-preferred routing paths, the location of the server being accessed by the client 702 through the OSP, and the relative locations of the client 702 and the destination server.

After the host 704 identifies an IP tunnel in a geographic region suitable for the subscriber making the request, the host 704 directs the client 702 to the identified IP tunnel (step 715). The host 704 also may transmit subscriber information to the IP tunnel to enable the IP tunnel to function as an OSP proxy capable of tailoring the content and user interfaces for the individual subscriber being routed. The client 702 then transmits subsequent communications to the Internet through the local IP tunnel (step 720).

In one implementation, the client 702 uses a browser application to transmit subsequent requests to the identified local IP tunnel in a standard Internet protocol, such as HTTP ("HyperText Transport Protocol"). However, other protocols also may be used. The local IP tunnel receives the subsequent communications (e.g., requests for Internet data) from the client (step 725) and then encapsulates the requests in a tunneling protocol (step 730). In a packet-based implementation, the requests may be encapsulated inside a standard Internet tunneling protocol, such as, for example, UDP ("User Datagram Protocol").

After encapsulating the requests (step 730), the local IP tunnel sends the encapsulated data to the Internet (step 735). The encapsulated data are directed to the proper destination server storing the data that satisfies the request. Next, the requested electronic data are retrieved from the destination server and received at the local IP tunnel (step 740). The requested electronic data then is transferred from the local IP tunnel (step 745), received by the client 702 (step 750), and finally rendered by the client 702 (step 755).

If the host 704 does not identify a suitable IP tunnel, or if identified IP tunnels are not available, the client 702 is directed to remote elements of the OSP host complex, and conventional processing ensues.

The procedure 800 of FIG. 8 generally pertains to communications directed to the client 702 from a device (e.g., a local server) through the IM tunnel. In one implementation, the IP tunnel effectively acts as a proxy to an OSP that located remotely from a client. As shown in FIG. 8, a server that has received communications from a client 702 through a proxy (e.g., IP tunnel) (step 805) segregates the communication from within the encapsulating tunneling protocol information (step 810). The tunneling protocol information includes information identifying the proxy (e.g., an IP address for an IP tunnel functioning as a proxy). Based on this identifying information, a responsive communication generated by the Internet accessible server may be routed to the proxy (step 805). Once routed to the proxy, the server-initiated communication may be routed to the client 702 based on identifying information for the client 702. Such identifying information may be located at the proxy, gleaned from the tunneling protocol information, and/or determined from the communication received by the server (step 805).

The described implementations identify an appropriate proxy according to relative differences in geographic locations between a client 702, a host 704, and a destination server residing on the Internet. However, other criteria, such as, load management information also can be used to identify an appropriate proxy.

Other implementations are within the scope of the following claims.

What is claimed is:

1. A method for enabling electronic communications between the Internet and a client system comprising:
   receiving, at a primary communications system configured to act as an access point to the Internet for data communications between the client system and the Internet, a request to access the Internet that is directed to the primary communication system, wherein the request is issued by an online identity operating the client system;
   processing the request at the primary communication system;
   identifying at the primary communication system, based on the processed request, a secondary communications system that is more optimally suited for providing Internet access to the client's system than the primary communications system; and
   enabling configuration of the client system to direct subsequent Internet access requests from the client system and to use the secondary communications system as an access point to the Internet for subsequent data communications between the client system and the Internet, such that the subsequent data communications between the client and the Internet pass through the secondary communications system.

2. The method of claim 1, wherein processing the request further comprises:
   authenticating the online identity or the client system at the primary communications system.

3. The method of claim 1, further comprising enabling configuration of the client system to direct data communications, which are subsequent to access from the client system, to the secondary communications system.

4. The method of claim 1, wherein access to the Internet is granted to the client system by the primary communications system.

5. The method of claim 1, wherein access to the Internet is granted to the client system by the secondary communications system.

6. The method of claim 3, further comprising encapsulating data communications in a tunneling protocol at the secondary communications system.

7. The method of claim 3, further comprising determining whether responses to data communications can be satisfied by electronic data stored in a cache at the secondary communications system.

8. The method of claim 3, further comprising performing filtering of data communications at the secondary communications system.

9. The method of claim 8, wherein the filtering is performed according to contents filtering.

10. The method of claim 1, wherein the primary communications system is an online access provider.

11. The method of claim 1, wherein processing the request further comprises determining a geographic location associated with at least one of the online identity and the client system, and wherein the geographic location is used as a basis for configuring the client system to direct subsequent Internet access requests from the client system.

12. The method of claim 1, wherein processing the request further comprises accessing a demographic profile of the online identity.

13. The method of claim 12, wherein the demographic profile includes client-preferred routing paths.

14. The method of claim 12, wherein the demographic profile includes software version of the client system.

15. The method of claim 12, wherein the demographic profile includes the type of communication equipment used for Internet access by the client system.

16. The method of claim 1, further comprising:
receiving, at a secondary communications system, subsequent data communications between the client and the Internet;
encapsulating subsequent data communications in an IP tunneling protocol at the secondary communications system; and
transmitting encapsulated data communications to the Internet using the IP tunneling protocol.

17. A method for enabling electronic communications with the Internet at a client system, comprising:
submitting a request to access the Internet that is directed to a primary communications system configured to act as an access point to the Internet for data communications between the client system and the Internet, wherein the request is issued by an online identity operating the client system;
receiving from the primary communications system, an indication of a secondary communications system that is more geographically proximate to the geographic location of the client system than the primary communications system;
reconfiguring the client system to submit future access requests to the secondary communications system based on the indication received;
submitting future requests to access the Internet from the client system to the secondary communications system; and
reconfiguring the client system to direct communications to the Internet, which are subsequent to access from the client system, to the secondary communications system.

18. A method for enabling electronic communications between a client and the Internet at a secondary communications system that is more geographically proximate to a geographic location of the client system than a primary communications system, comprising:
receiving, from a primary communications system configured to act as an access point to the Internet for data communications between the client system and the Internet, an indication to process requests to access the Internet that are issued by an online identity operating a client system, where the access requests are configured to enable access to the Internet;
based on the indication received, reconfiguring the secondary communications system to process requests to access the Internet from the client system; and
subsequent to Internet access by the client system through the secondary communications system, receiving data communications between the client system and the Internet at the secondary communications system.

19. The method of claim 18, further comprising processing access requests at the secondary communications system.

20. The method of claim 19, wherein processing access requests further comprises:
authenticating the online identity or the client system at the primary communications system.

21. The method of claim 19, wherein access to the Internet is granted to the client system by the secondary communications system.

22. The method of claim 19, further comprising encapsulating data communications in a tunneling protocol at the secondary communications system.

23. The method of claim 19, further comprising determining whether responses to data communications can be satisfied by electronic data stored in a cache at the secondary communications system.

24. The method of claim 19, further comprising:
receiving, from the primary communications system, a subscriber information related to the online identity operating the client system;
performing filtering of data communications between the client system and the Internet at the secondary communications system based on the received subscriber information.

25. The method of claim 24, wherein the filtering is performed according to contents filtering.

26. The method of claim 24 wherein the subscriber information includes at least one of parental control settings of the online identity or user preferences of the online identity.

27. The method of claim 24 wherein the subscriber information includes a demographic profile of the online identity.

28. The method of claim 27, wherein the demographic profile includes client-preferred routing paths.

29. The method of claim 27, wherein the demographic profile includes software version of the client system.

30. The method of claim 27, wherein the demographic profile includes geographic location of the client system.

* * * * *